Figure 1:
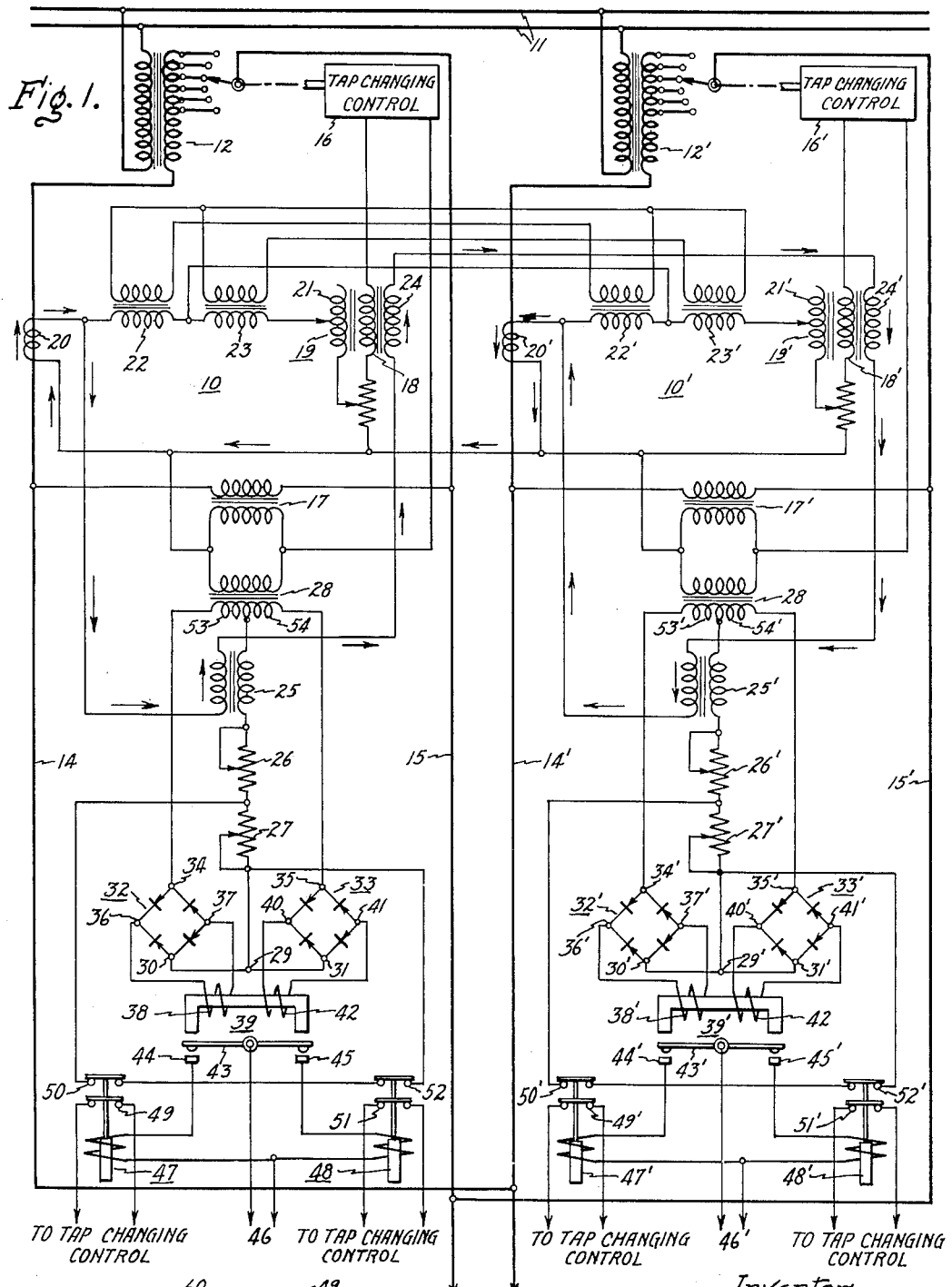

July 3, 1956  H. E. PINNEY  2,753,467
PARALLEL OPERATION OF TRANSFORMERS
Filed Feb. 17, 1955

Inventor
Harold E. Pinney,
by Gilbert P. Tarleton
His Attorney.

United States Patent Office 2,753,467
Patented July 3, 1956

2,753,467

PARALLEL OPERATION OF TRANSFORMERS

Harold E. Pinney, Pittsfield, Mass., assignor to General Electric Company, a corporation of New York Application February 17, 1955, Serial No. 488,855

8 Claims. (Cl. 307—51)

This invention relates to automatic parallel operation of alternating current power supply systems, and more in particular to directional lockout protection for parallel operation of voltage regulating transformer systems or other voltage regulating systems.

When a number of automatically controlled voltage regulating transformers such as load tap changing transformers are parallel connected, circulating currents often flow in the circuits due to unequal secondary voltages of the transformers. These circulating currents do no useful work, and cause wasteful losses in the system. Various paralleling circuits have been proposed for correcting this condition automatically to reduce or eliminate the circulating currents. Typical circuits of this type are disclosed in U. S. Patent 2,322,249 issued on June 22, 1943, on an application of S. Minneci and assigned to the present assignee and also in U. S. Patent 2,323,716 issued on July 6, 1943, on an application of T. C. Lennox and also assigned to the present assignee.

In a typical load tap changing transformer circuit a voltage proportional to the secondary voltage of each transformer is obtained by means of a potential transformer connected across each load tap changing transformer output. A voltage regulating relay connected to the secondary windings of the potential transformer responds to changes in the output voltage of the tap changing transformer to actuate a tap changing motor to make a corrective change in the taps of the secondary of the load tap changing transformer.

To hold the voltage constant at the load, a line drop compensator is added to each transformer control circuit. A current proportional to the line current of each transformer is passed through an adjustable impedance which is connected in series with the voltage regulating relay. The voltage drop in the impedance is proportional to the line voltage drop, and the tap changing motor thus makes tap changes to hold the load voltage constant. To prevent the line drop compensator from being sensitive to circulating current and thereby causing erroneous tap changes, various means are provided for separating the load currents and circulating currents, and permitting only the load currents to pass through the line drop compensator. In one method, a load current transformer is connected in series with each line drop compensator reactor, and by connecting the secondaries of all of the load current transformers in series the circuit offers a high impedance to circulating current. The circulating currents component may be bypassed to flow through another reactor connected to the line drop compensator, and by proper connection of these reactors, the tap changing motor will act to minimize the circulating currents.

In order to save transformer losses during light load periods, one or more of the load tap changing transformers are sometimes removed from service, and the full load current must thereby be supplied by the remaining transformers. In order to prevent erroneous line drop compensation from occurring due to such changes in load current, a compensating current transformer may be placed in series with each load current transformer, the secondary windings of the compensating current transformers being connected in series, and a connection made between the junctions of the load current and compensating current transformers. This arrangement forces proper division of current through the line drop compensators.

In such circuits it is often advisable to provide protection against excessive circulating current. In the past, overcurrent relays have been connected in series with the circuits through which only the circulating current component passes. Upon the occurrence of a condition causing excessive circulating current, the overcurrent relay contacts lock out the controls of all transformers, and thereby prevent further operation of the tap changers in either direction until the cause of lock-out is investigated and the controls restored manually to normal operation. This arrangement has been found to be unsatisfactory, however, because certain momentary severe voltage disturbances in the system cause unnecessary lock-out of the controls. This difficulty has been overcome in some instances by the addition of relays and control interconnections between the transformers to prevent such momentary disturbances from locking out the controls. Such additional relays and interconnections in the past have complicated the control system and are therefore very undesirable, and they do not correct for the effect of intermittent shock.

For example, in the operation of two transformers in parallel, possible differences in time of closing of contacts or time delay relays may cause several tap changes to be made on one unit before the other unit has changed at all. This may give rise to excessive circulating currents. In past systems, unless complicated circuits were used, the entire system would be locked out, and require manual resetting.

These difficulties have been overcome in the present invention by employing an inexpensive directional current device operative upon the occurrence of excessive circulating current in the transformer circuits, to lock-out the controls of the transformers only insofar as tap changes tending to increase the excessive current condition are concerned. This system requires a minimum of components, and enables the system to return to its normal operating position automatically upon removal of the abnormal condition, and upon removal of the excess circulating currents, to automatically disengage the lock-out. Briefly stated, in one embodiment of the invention, a circulating current component in the control system circuit creates an unbalanced current in a balanced modulator circuit. The modulator circuit employs a polarized relay to detect the unbalanced current, and when excessive circulating currents arise, the polarized relay contacts act to lock-out the tap change motor from further increase of the excessive condition. The circuit is connected such that tap changes in the opposite direction are not prevented, and upon removal of the excessive condition the lockout is disengaged.

It is therefore an object of this invention to provide improved directional lock-out protection with a minimum of inexpensive readily available circuit components for parallel operation of alternating current power supply systems.

It is also an object of this invention to provide a balanced modulator type circuit for directional lock-out protection of a voltage regulator paralleling system whereby load voltage changes tending to increase an excessive circulating current condition of a predetermined value are prevented without preventing load voltage changes in the opposite direction, and including means for automatically disengaging the lock-out upon correction of the excessive current condition.

My invention will be better understood from the following description taken in connection with the accompanying drawing and its scope will be pointed out in the appended claims.

Figure 2:
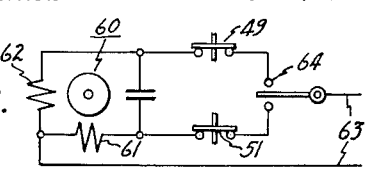

In the drawing Fig. 1 is a circuit diagram of one embodiment of my invention as applied to a typical system for paralleling load tap changing transformers, and Fig. 2 is a circuit diagram of a portion of the tap changing control unit of Fig. 1 and illustrating a typical method of controlling the tap changing motor drive.

Referring now to the drawing, I show therein a load tap changing transformer system comprising two power circuits 10 and 10′. Since these circuits are substantially identical, in order to reduce confusion the same reference numerals will be used to denote similar elements in the two circuits, the elements of circuit 10′ being distinguished by having prime marks associated therewith. Accordingly, where the circuits are identical, the detailed description will refer only to one of the circuits.

The two circuits are supplied by a common source of supply 11 across which are connected the primary windings of the load tap changing transformers 12 and 12′. The two circuits also have a common load 13 which is connected across the secondary windings of the load tap changing transformers in parallel by leads 14, 14′, 15 and 15′. The leads 15 and 15′ are connected to the tapped end of the load tap changing transformers, and the taps are changed by means of tap changing control units 16 and 16′ of any suitable type, the control of which will be described in more detail in the following paragraphs.

A potential porportional to the output voltage of the load tap changing transformer is provided by means of potential transformer 17 which is connected across the leads 14 and 15. The secondary winding of the potential transformer is connected to the tap changing control unit 16 by way of winding 18 of the line drop compensator 19. Due to voltage sensitive means (e. g. voltage regulating relays) within the tap changing control unit, variation in output voltage of the transformer 12 from a predetermined value actuates the motor drive in the unit to select the proper tap for correct output voltage.

In order to compensate for line voltage drop and thus provide a constant load voltage, a current transformer 20, coupled to lead 14 and providing a current proportional to the load tap changing transformer current, is connected across the winding 21 of line drop compensator 19. Since it is desirable to allow only the load current component to flow through the winding 21, a load current transformer 22 is placed in series with the winding 21 and interconnected with the similar winding 21′ in the manner disclosed in the above mentioned Minneci and Lennox patents to present a low impedance for the flow of load currents, but a high impedance for the flow of the circulating current component. This effect is due to the reflection of circulating current in the secondary of the load current transformer, the reflected current being in such a direction as to oppose the flow of circulating current. Were means not provided for removing the circulating current from this circuit, erroneous tap changes would be made, since an increase in load current requires an increase in output potential in order to maintain a constant load voltage, whereas an increase in circulating current in phase with the load voltage would normally be corrected by decreasing the secondary voltage of the load tap changing transformer.

When one or more paralleled load tap changing transformers are removed from service, the remaining transformers must carry the full load. This results in an increase in the load current, and unless means are provided for compensating for this condition, the additional current through the line drop compensator will cause an erroneous tap change to be made. In one method for removing this difficulty, a compensating current transformer 23 is placed in series with the load current transformer and connected in the manner disclosed in the above mentioned Minneci patent. This arrangement forces the additional units of the load current component to be bypassed and not flow through the line drop compensator.

The circulating current component of the current transformer 20 current flows through third winding 24 of the line drop compensator 19, and this third winding 24 is interconnected with the similar winding 24′ in such a manner that the tap changing control always tends to reduce circulating current. This type of connection is well known, and a modified form as illustrated by Minneci employs separate transformers for the same purpose.

The circulating current which flows through the third winding 24 of the line drop compensator also flows through the primary winding of a circulating current transformer 25. The transformer 25 secondary winding is connected in series with variable resistances 26 and 27. The resistances and the circulating current transformer 25 form the common leg of a balanced modulator circuit. One end of this common leg is connected to the center tap on the secondary winding of an auxiliary potential transformer 28. The primary winding of the auxiliary potential transformer is connected in parallel with the secondary of potential transformer 17, and the auxiliary potential transformer provides an isolated output of the correct voltage for use in the balanced modulator circuit. The other end of the common leg of the balanced modulator is connection to the junction 29 between corners 30 and 31 of bridge rectifier circuits 32 and 33 respectively. The opposite corners 34 and 35, of the bridge rectifiers are connected to the secondary winding of auxiliary potential transformer 28.

The remaining corners 36 and 37 of the bridge circuit 32 are connected to winding 38 of polarized relay 39. Similarly, remaining corners 40 and 41 of bridge circuit 33 are connected to winding 42 of polarized relay 39. The polarized relay is of the differential current type, a typical construction being disclosed in U. S. Patent 2,612,544 which issued on September 30, 1952, to R. T. Fisher, and their action is controlled by the differential of the currents passing through a pair of windings on their core.

Referring again to the drawing, the polarized relay 39 has a pivoted arm 43 with normally open contacts 44 and 45 positioned at its ends so that rotation of the arm 43 in one direction closes one contact and rotation in the opposite direction closes the other contact. A source of potential 46 has one line connected to the pivoted arm 43 and the other line connected to the coils of relays 47 and 48. The other ends of the relay coils are connected to contacts 44 and 45 respectively.

The relay 47 has two sets 49 and 50 of normally closed contacts, and similarly the relay 48 has two sets 51 and 52 of normally closed contacts. The normally closed contacts 50 and 52 are connected in series across the variable resistance 27. The normally closed contacts 49 and 51 are connected by means of leads (not shown) to the tap changing control unit and are connected so that opening of contact 49 prevents the motor drive from increasing the secondary voltage of the load tap changing transformer, and opening of contact 51 prevents the motor drive from decreasing the secondary voltage of load tap changing transformer.

In Fig. 2 is illustrated a typical circuit for controlling the tap changing motor drive. In this circuit, a reversible motor 60 having two windings 61 and 62 has the lead common to the two windings connected to a source of potential 63. The other ends of the two windings are connected respectively to the contacts 49 and 51. These contacts are the contacts of relays 47 and 48 respectively of Fig. 1. The contacts serve to break the line between the ends of the motor windings 61 and 62 and the contacts 64 of a voltage regulating relay (not shown) in the tap changing control unit. This circuit merely illustrates one method of controlling a tap changing motor, and other well known circuits may also be used without departing from the scope of this invention.

In operation, the voltage appearing across the secondary winding of auxiliary potential transformer 28 is proportional to the voltage between leads 14 and 15 since the primary of the auxiliary potential transformer is connected to the potential transformer 17. The voltage appearing across the secondary winding of the auxiliary potential transformer causes a current to flow through the coils 38 and 42 of the polarized relay 39 by way of bridge rectifiers 32 and 33. The two halves of the modulator circuit are identical, so that equal currents will flow through coils 38 and 42, and no current flows through the center leg of the modulator due to the auxiliary potential transformer voltage. By action of the rectifier bridge circuits 32 and 33, only direct current is allowed to flow through the coils 38 and 42. Since the coils 38 and 42 are connected differentially, no resultant flux is induced in the relay 39, and the contacts 44 and 45 of the relay 39 remain open.

Now assuming that the voltage of load tap changing transformer 12 has increased in relation to the voltage of transformer 12', a circulating current is caused to flow through transformers 12 and 12'. This causes a current proportional to the circulating currents to flow in the direction indicated by the arrows through current transformers 20 and 20', circulating current transformer 25 and 25' primary windings, and, windings 24 and 24' of the line drop compensators. The voltage induced in the secondary winding of circulating current transformer 25 adds to the voltage appearing across one half 53 of the secondary winding of the auxiliary potential transformer 28 and subtracts from the voltage appearing across the other half 54 of the secondary of the auxiliary potential transformer 28. This results in increased current through coil 38 of the polarized relay 39 and decreased current in the coil 42 of the polarized relay, and therefore contact 44 of the polarized relay 39 closes and energizes relay 47.

Similarly, the voltage induced in the secondary winding of circulating current transformer 25' adds to the voltage appearing across one half 54' of the secondary winding of the auxiliary potential transformer 28' and subtracts from the voltage appearing across the other half 53' of the secondary of the auxiliary potential transformer 28'. This results in increased current through coil 42' of the polarized relay 39' and decreased current in the coil 38' of the polarized relay 39' and therefore contact 45' of polarized relay 39', closes and energizes relay 48'.

The opening of contacts 49 by the energizing of relay 47, as previously stated, prevents further changes in the tap changing control unit 16 that tend to increase the potential of the secondary winding of transformer 12. However, the contacts 51 of relay 48 remain closed, so that the tap changing control unit may make changes to reduce the secondary voltage of the load tap changing transformer 12. Similarly, the control unit of load tap changing transformer 12' is locked out from decreasing the secondary voltage thereof, but may increase the secondary voltage.

In order to control the value of circulating current that will actuate the polarized relays, the sensitivity of the balanced modulators may be varied by changes in the value of resistances 26 and 26'. Thus the polarized relay may be made to operate at any predetermined value of circulating current.

As previously mentioned, the normally closed contacts 50 of relay 47 and 52 of relay 48 are in series, and form a short circuit path around the resistance 27. Thus, when an excessive circulating current condition exists, this short circuit path is removed due to the opening of one of the contacts 50 or 52, and the resistance 27 is inserted in the common leg of the balanced modulator. A certain predetermined value of circulating current is required to close the contacts 44 or 45 of relay 39. This predetermined value is determined by setting of resistance 26. Due to the characteristics of the relay 39, if no extra resistance is inserted in the bridge circuit, the circuit, the circulating current would have to decrease to about 10 to 20 per cent of the pickup or contact closing value before the contacts would reopen. For best results the dropout or contact opening value of current relay 39 should be as close as possible to the pickup value and still provide sufficient positive action of the relay contacts. Inserting the resistor 27 in the center arm of the bridge circuit when one of the relay contacts 44 or 45 are closed results in less positive action of relay 39, and the relay will therefore open its contacts before the circulating current has decreased to the above stated 10 to 20 per cent of the pickup value. Tests have shown that a dropout value of circulating current of about 50 per cent of the pickup value results in satisfactory hold-in action of the relay.

The previously described circuit is merely one embodiment of this invention in conjunction with a typical load tap changing transformer system. Although the description relates primarily to load tap changing transformer systems, this invention may also be used in conjunction with other voltage regulating systems such as that provide means for making the proper connections thereto. Any substantially constant source of potential having the proper amplitude, frequency, and phase may be substituted for the auxiliary potential transformer. Although the drawing and description apply to the paralleling of two transformers, any number of transformers may be thus paralleled.

My present invention is an improvement over the invention of the application of S. Minneci, Serial No. 483,247 filed January 21, 1955 and assigned to the present assignee which discloses and claims broadly, so as to dominate the present invention, a system for parallel operation of voltage regulating systems and directional current means, controlled by current circulating between the systems, for preventing increase of the circulating current beyond a predetermined maximum value without preventing a decrease in the circulating current from the predetermined maximum value.

It will be understood, of course, that, while the form of the invention herein shown and described constitutes a preferred embodiment of the invention, it is not intended herein to illustrate all of the possible ramifications of the invention. It will be also understood that the words used are words of description rather than of limitation, and that various changes may be made without departing from the spirit and scope of the invention.

What I claim as new and desire to secure by Letters Patent of the United States is:

1. In a system for parallel operation of a plurality of voltage regulating transformers, means for preventing load voltage changes on one of said transformers that increase circulating current beyond a predetermined maximum value while permitting said load voltage changes that decrease said circulating current, said means comprising means for obtaining a first voltage proportional to said circulating current, means for obtaining a second substantially constant voltage, means for obtaining third and fourth voltages proportional respectively to the sum and difference of said first and second voltage, and polarized differentially sensitive means operated by said third and fourth potentials, said polarized differentially sensitive means having first electrical contacts operative when said third voltage exceeds said fourth voltage by a predetermined value to prevent increasing of said one transformer load voltage, and second electrical contacts operative when said fourth voltage exceeds said third voltage by a predetermined value to prevent decreasing of said one transformer load voltage.

2. In a system for parallel operation of voltage regulating transformers, means for preventing load voltage changes on each of said transformers that increase circulating current beyond a predetermined maximum value while permitting said load voltage changes that decrease said circulating current, said means comprising separate means for obtaining first voltages proportional to the circulating current of each of said transformers, means for obtaining a second substantially constant voltage, separate balanced modulator means for each of said transformers combining said first voltage of each of said transformers respectively and said second voltage to obtain third and fourth voltages proportional to the sum and difference respectively of said first and second voltages, and separate polarized differentially sensitive means connected to each of said balanced modulator means and operated by said third and fourth voltages, each of said polarized differentially sensitive means having first electrical contacts operative when said third voltage exceeds said fourth voltage by a predetermined value to prevent increasing the load voltage of the respective transformer, and second electrical contacts operative when said fourth voltage exceeds said third voltage by a predetermined value to prevent decreasing of the load voltage of said respective transformer.

3. In a system for parallel operation of a plurality of voltage regulating transformers, means for preventing load voltage changes on said transformers that increase circulating current in said system beyond a predetermined maximum value while permitting said load voltage changes to decrease said system circulating current, said means comprising separate inductive means for obtaining first voltages proportional to the current circulating in each of said transformers, means for obtaining a second substantially constant voltage, separate balanced modulator means for each of said transformers combining said first and second voltages to obtain third and fourth voltages proportional respectively to the sum and difference of said first and second voltages of each transformer, and polarized differentially sensitive means for each of said transformers connected to said balanced modulator means respectively and having first windings supplied by said third voltage and second windings supplied by said fourth voltage, said polarized differentially sensitive means each having first electrical contacts operative when said third voltage exceeds said fourth voltage by a predetermined value to prevent load voltage changes that increase the load voltage of its respective transformer, and second electrical contacts operative when said fourth voltage exceeds said third voltage by a predetermined value to prevent load voltage changes that decrease the load voltage of said respective transformer.

4. In a system for parallel operation of a plurality of voltage regulating transformers, means for preventing load voltage changes on said transformers that increase circulating current in said system beyond a predetermined maximum value while permitting said load voltage changes that decrease said system circulating current, said means comprising a balanced modulator circuit having a center tapped source of potential, one end of a source of current proportional to the circulating current of one of said transformers connected to said center tap, and a polarized differential current relay having first and second windings, said first winding being connected between the other end of said source of current and one end of said source of potential, said second winding being connected between said other end of said source of current and the other end of said source of potential, said polarized differential current relay having first electrical contacts operative when the current through said first winding exceeds the current through said second winding by a predetermined value to prevent load voltage changes that increase the load voltage of said one transformer and second electrical contacts operative when the current through said second winding exceeds the current through said first winding by a predetermined value to prevent load voltage changes that decrease the load voltage of said one transformer.

5. In a system for parallel operation of a plurality of voltage regulating transformers, means for preventing load voltage changes on said transformers that increase circulating current in said system beyond a predetermined maximum value while permitting said load voltage changes that decrease said system circulating current, said means comprising a balanced modulator circuit having a center tapped potential transformer means having a primary circuit connected to the load circuit of one of said transformers, one end of a source of current proportional to the circulating current of said one transformer connected to said center tap, a first rectifier means connected to one end of the secondary circuit potential transformer means, a second rectifier means connected to the other end of said secondary circuit potential transformer means, the other end of said rectifier means being connected to the other end of said source of current, and a polarized differential current relay having first and second windings, said first and second windings being connected such that current flowing through said first rectifier passes through said first winding and current flowing through said second rectifier passes through said second winding, said polarized differential current relay having first electrical contacts operative when said first winding current exceeds said second winding current by a predetermined value to prevent load voltage changes that increase the load voltage of said one transformer and second electrical contacts operative when said second winding current exceeds said first winding current by a predetermined value to prevent load voltage changes that decrease the load voltage of said one transformer.

6. In a system for parallel operation of a plurality of voltage regulating transformers, means for preventing load voltage changes on said transformers that increase circulating current in said system beyond a predetermined maximum value while permitting said load voltage changes that decrease said system circulating current, said means comprising a balanced modulator circuit having a center tapped potential transformer means having a primary circuit connected to the load circuit of one of said transformers, one end of a source of current proportional to the circulating current of said one transformer connected to said center tap, a first bridge rectifier means having one junction connected to the one end of the secondary circuit of said potential transformer means and the opposite junction connected to the opposite end of said source of current, a second bridge rectifier means having one junction connected to the other end of the secondary circuit of said potential transformer means and the opposite junction connected to said opposite end of said source, a first winding of a polarized differential current relay connected to the remaining junctions of said first bridge rectifier means, and a second winding of said polarized differential current relay connected to the remaining junctions of said second bridge rectifier means, said polarized differential current relay having first electrical contacts operative when the current through said second winding by a predetermined value to prevent load voltage changes that increase the load voltage of said one transformer and second electrical contacts operative when said second winding current exceeds said first winding current by a predetermined value to prevent load voltage changes that decrease said load voltage of said one transformer.

7. In a system for parallel operation of a plurality of voltage regulating transformers, means for preventing load voltage changes on each of said transformers that increase circulating current in said system beyond a predetermined maximum value while permitting said load voltage changes that decrease said system circulating current, said means comprising a balanced modulator circuit having a center tapped potential transformer means having a primary circuit connected to the load circuit of one of said transformers, a center leg for said modulator circuit having one end connected to said center tap and comprising a series combination of a source of current proportional to the circulating current of said one transformer and a variable resistance means, a first winding of a polarized differential current relay connected between the other end of said center leg and one end of the secondary circuit of said potential transformer means, a second winding of said polarized differential current relay connected between said other end of said center leg and the other end of the secondary circuit of said potential transformer means, rectifier means for rectifying current flowing through said first and second windings, conductor means shorting at least a portion of said resistance means, and means associated with the contacts of said polarized relay for unshorting said portion of said resistance means when said relay is energized, said polarized differential current relay having first electrical contacts operative when said first winding current exceeds said second winding current by a predetermined value to prevent load voltage changes that increase the load voltage of said one transformer, and second electrical contacts operative when said second winding current exceeds said first winding current by a predetermined value to prevent load voltage changes that decrease the load voltage of said one transformer.

8. In a system for parallel operation of a plurality of alternating current power supply systems, means for decreasing circulating current in said systems and inhibiting changes in load voltage of said systems that increase said circulating current beyond a predetermined maximum value while permitting said load voltage changes that decrease said circulating current, said means comprising source of current means obtaining a current proportional to the circulating current of each of said systems, separate means for changing the load voltage of each of said systems, continuously acting means in each of said systems actuated by said proportional current of the respective system for changing the load voltage of the respective system to reduce circulating current, a balanced modulator circuit having a center tapped potential transformer means having a primary circuit connected to the load circuit of one of said systems, one end of said source of current for said one system connected to said center tap, a first bridge rectifier means having one junction connected to the one end of the secondary circuit of said potential transformer means and the opposite junction connected to the opposite end of said source of current, a second bridge rectifier means having one junction connected to the other end of the secondary circuit of said potential transformer means and the opposite junction connected to the opposite end of said source of current, a second bridge rectifier means having one junction connected to the other end of the secondary circuit of said potential transformer means and the opposite junction connected to said opposite end of said source, a first winding of a polarized differential current relay connected to the remaining junctions of said first bridge rectifier means, and a second winding of said polarized differential current relay connected to the remaining junctions of said second bridge rectifier means, said polarized differential current relay having first electrical contacts operative when the current through said first winding exceeds the current through said second winding by a predetermined value to prevent load voltage changes that increase the load voltage of said one transformer and second electrical contacts operative when said second winding current exceeds said first winding current by a predetermined value to prevent load voltage changes that decrease said load voltage of said one transformer.

No references cited.